CHANGE IN CYCLIC DEFLECTION DUE TO CRACK ON TOP SURFACE.

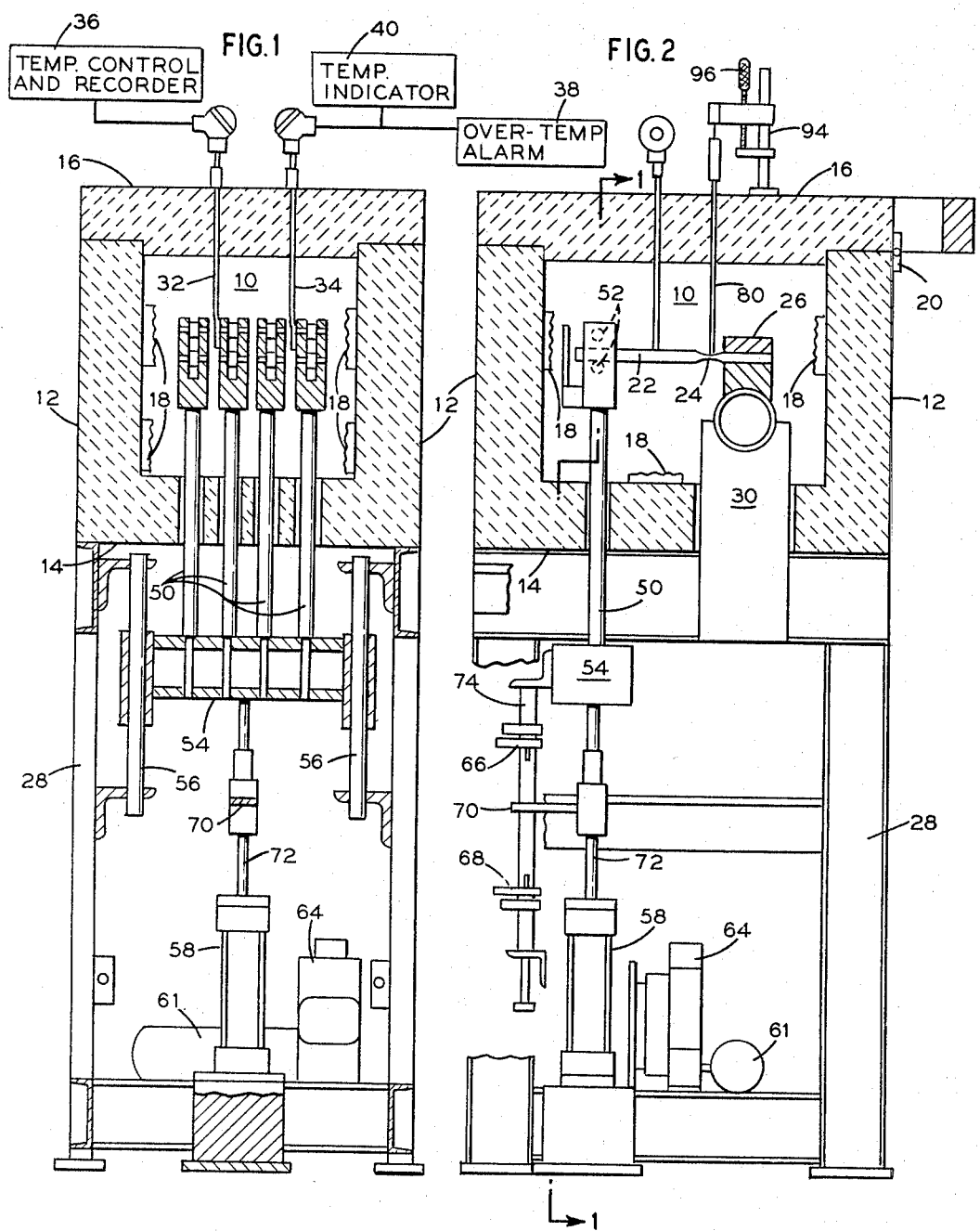

CHANGE IN CYCLIC DEFLECTION DUE TO CRACK ON BOTTOM SURFACE

CHANGE IN CYCLIC DEFLECTION DUE TO CRACK ON BOTH SURFACES

United States Patent Office 3,381,526
Patented May 7, 1968

3,381,526
FATIGUE TESTING APPARATUS
AND METHOD
Vijay Rastogi and Kenneth D. Ives, Alliance, Ohio, assignors to The Babcock & Wilcox Company, New York, N.Y., a corporation of New Jersey
Filed May 10, 1965, Ser. No. 454,477
15 Claims. (Cl. 73—91)

ABSTRACT OF THE DISCLOSURE

A method and apparatus for flexurally fatigue testing a test specimen provided with a waist section intermediate the ends of the specimen. The waist section tends to concentrate maximum stress in the area defined by the waist section. One end of the test specimen is held fixed and the other end repeatedly flexed in opposite transverse directions while a count is taken of the number of flexing cycles experienced by the specimen. Apparatus which responds to changes in deflection, cooperates with the specimen at a point between the fixed end and the point of maximum stress for terminating counting and/or flexing when the specimen fails due to fatigue.

---

This invention relates to flexure fatigue testing apparatus and methods, and more particularly to improvements therein for precisely determining failure of a specimen and automatically registering the number of flexing cycles required to produce the failure.

Flexure fatigue testing is performed to determine the number of controlled cyclic deflections a specimen of a given material can withstand at a predetermined stress-strain level. In flexure fatigue testing of cantilevered specimens the reliability and accuracy of the test results depend largely on the uniformity and precision of the cyclically applied loading to which the free or unrestrained end of the specimen is subjected, correlation of the resultant deflection, and also on the ability to detect incipient failure of the specimen and at that precise point to terminate the counting or recording of flexure loading of the specimen.

Past practice has been to associate failure of a specimen with a sudden reduction in the power required to flex the specimen; or to associate failure with a lowering of the natural frequency of the specimen; or to a sudden disproportionate increase in the measured free end deflection. Apparatus associated with the conduct of tests using the foregoing criteria has frequently yielded unreliable, inaccurate results, attributed largely to the fact that the specimen may not always be uniformly deflected during the repeated flexure program, or the loading of the specimen is not terminated at the instant of specimen failure, and at times for both reasons.

The problem of overcoming the shortcomings of the prior art apparatus and past test procedures is further complicated in high temperature fatigue testing, where the specimen is subjected to temperatures up to 1200° F., and even beyond, because many measuring and control devices currently available are not rugged enough to withstand such high temperature service.

With the present invention, an elongated cantilevered specimen has a waist portion of reduced cross section intermediate the ends thereof to provide a focal point of predictable failure. The specimen is clamped at one end, and the free end of the specimen undergoes cyclic deflection in response to an alternating predetermined loading force applied by a reciprocating member. The latter is actuated by suitable motivating apparatus, to be described. Provision is made to ensure precise cyclic deflections of the free end of the specimen, preferably by means of limit switches operatively associated with the motivating apparatus to control the direction and stroke of the reciprocating member. In addition, a counter is operatively associated with the limit switches to record the number of cyclic deflections, with provision to terminate operation of the counter immediately upon occurrence of specimen failure. According to the present invention, operation of the counter is terminated in response to a substantial deviation in extreme deflection of the specimen at a location between the waist portion and its clamped end. Optionally, the machine can be disconnected from its power source or otherwise shut down simultaneously with, or following, termination of counter operation. In a multiple specimen testing machine, there is a counter for each specimen which stops counting when its associated specimen fails, and the machine is shut down with the failure of the last specimen.

The apparatus of the present invention, with its improved failure detection device and cyclic load termination control, has the advantage of operating with constant power input, also without regard to the natural vibrational frequency of the specimen, and without having to locate electric or photoelectric apparatus in high temperature environment. Furthermore, the apparatus of the present invention may include a heating chamber for housing the specimen and testing it at elevated temperature. With a heating chamber, a quartz rod substantially insensitive to thermal environment may extend through a chamber wall and into contact with the specimen between its waist and its clamped end for transmitting finite values of transverse deflections of the specimen as they occur within the heating chamber to apparatus which will sense any substantial change in deflection values and terminate the counting and/or flexing operation.

Various other objects, features, and advantages of the invention will appear more fully from the detailed description which follows, taken in connection with the accompanying drawings forming a part of the present invention, and in which:

FIG. 1 is a front view, partly in section, of fatigue testing apparatus constructed according to the invention;

FIG. 2 is a side view, partly in section, of the apparatus of FIG. 1;

Figure 3:
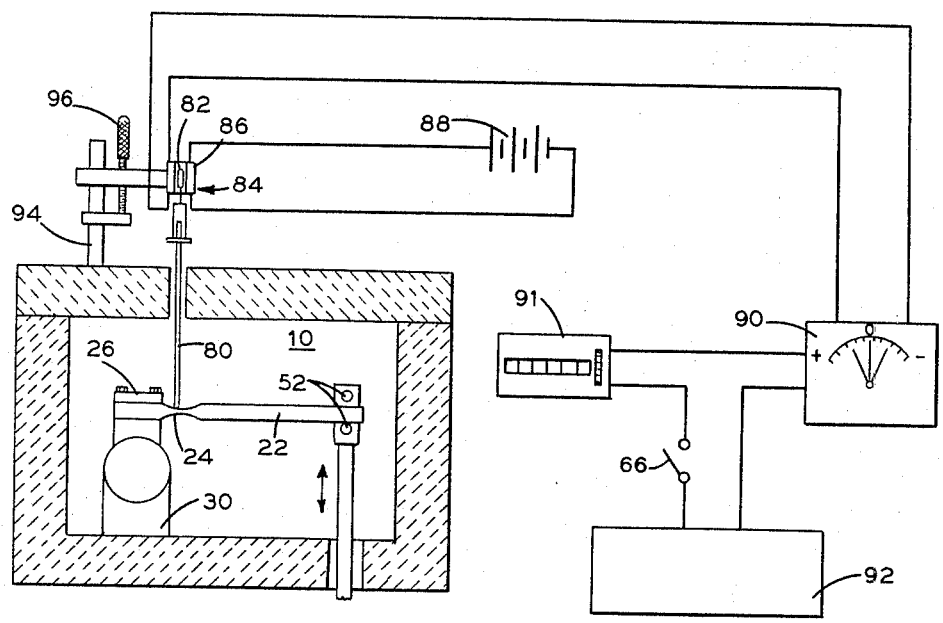
FIG. 3 is a diagrammatic view of the failure detection device incorporated in the apparatus of FIG. 1.

The present invention is applicable to the fatigue testing of materials over the temperature range from ambient room temperature to approximately 1200° F., with particular reference to flexure stressing with uniform extreme deflection during repeated cycling in the low frequency range, e.g. 1000 to 100,000 cycles. The apparatus is especially well suited to the cyclic testing of cantilever-beam specimens with provision for holding the specimen in the maximum strained position for precisely predetermined, extended periods of time within each cycle. Thus, the strain-time relationship may be varied as desired for each test program. It will be shown that the apparatus of the present invention is capable of testing a plurality of specimens, preferably as many as four, simultaneously under essentially identical, temperature and loading conditions to obtain one statistical datum point from a single test program.

As shown in the drawings, apparatus constructed according to the invention comprises a furnace chamber 10 defined by side walls 12, a bottom wall 14, and a top wall 16, all of thermally insulated construction. Electrical heating elements 18 are mounted on the side and bottom walls; and the top wall 16 is secured along one edge by hinges 20 so that it may be moved to vertical or open position for providing access to the chamber 10.

Disposed within the chamber 10 are cantilever-beam type specimens 22, each having a waist portion 24 intermediate the ends thereof, but preferably closest to the end to be clamped. This type of specimen gives a uniaxial stress and strain distribution at the waist or gauge section. Preferably, individual specimens 22 are 12½ inches long with a rectangular cross section ½ inch wide and ¾ inch deep. The waist portion 24 is milled to a radius of 2¾ inches with a minimum thickness of ⅜ inch at the center, or narrowest portion thereof. The specimen may be provided with a suitably polished surface, an eight-grit finish having been found satisfactory in experimental use of the apparatus here described. As shown in the drawings, four specimens 22 are disposed centrally of the furnace chamber 10 in horizontal, parallel relationship, with one end thereof clamped tightly in a vise 26. A frame 28 supports the wall structure defining the furnace chamber from the bottom thereof, and it has an upright member 30 extending upwardly through the bottom wall 14 to support the vise 26.

Extending downwardly through the top wall 16 and terminating centrally of the furnace chamber 10 are two thermocouples 32 and 34; one of which, 32, is connected to a temperature controller and recorder 36; and the other of which, 34, is connected to an over-temperature alarm 38 for automatically disconnecting the main power supply to the apparatus in the event the temperature in the furnace chamber exceeds control limits. A temperature indicator 40 is connected in the line between the thermocouple 34 and the alarm 38 in order to provide means for checking the temperature reading of the recorder 36. Preferably, the temperature controller employs a saturable reactor (not shown), and this combination is capable of maintaining any desired predetermined furnace temperature up to 1200° F., with deviations of less than 5° F.

A force is applied to the free end of a specimen 22 by a reciprocating member 50 having a pair of vertically spaced rollers 52 which are engageable one at a time with the specimen. The bottom roller engages the specimen 22 when it is deflected upwardly and the top roller bears against the specimen when it is deflected downwardly. By providing for clearance between at least one of the rollers 52 and the specimen 22, the specimen is deflected as a free cantilever rather than as a guided cantilever. There is one reciprocating member 50 and one pair of rollers 52 for each specimen 22, each member 50 extending in vertical direction through the bottom wall 14 and secured at the lower end thereof to a crosshead 54. The latter is adapted to move in vertical direction, being guided for vertical movement by vertical guide bars 56 carried at the sides of the frame 28.

Figure 4:
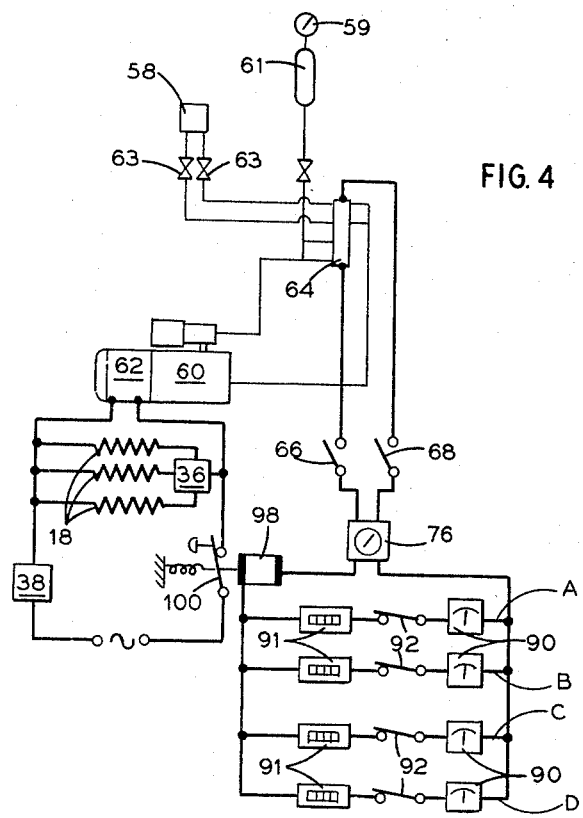
FIG. 4 is a schematic view showing the hydraulic and electric circuitry of the apparatus of FIG. 1.

As shown in FIGS. 1 and 2, a hydraulic double-acting cylinder 58 is employed to drive the crosshead 54 which, in turn, transmits motive force to the four members 50 connected through the respective pairs of rollers 52 to the specimens 22 in the furnace chamber 10. Referring now to FIG. 4, the hydraulic cylinder 58 is pressurized by a hydraulic pump 60 driven by a motor 62. A conventional pressure gauge 59 and accumulator 61 may also be provided in the hydraulic circuit.

The pump pressure may be varied in order to obtain the desired strain rate in testing a specimen. Strain rate is directly proportional to the rate at which the specimen is deflected and this, in turn, depends directly on piston speed in the cylinder 58. By adjusting the pressure in the cylinder 58, the members 50 can be made to move very rapidly from one end of their stroke to the other, thereby achieving maximum strain rate. On the other hand, very low strain rates are obtained by reducing pump pressure. The latter effect may also be achieved by reducing the speed of the pump motor 62 and by providing suitable flow control, and by adjustment of valves 63 in the hydraulic line between the pump 60 and the cylinder 58 (see FIG. 4).

The direction of piston movement in the double-acting cylinder 58 is controlled by a four-way, electrically operated, reversing valve 64, which is actuated by upper and lower limit switches, respectively designated by the numerals 66 and 68. The limit switches are adapted to be engaged by a tab 70 carried on a push rod 72 transmitting motion between the cylinder 58 and the crosshead 54. The limit switches 66 and 68 are adjustably positioned in selected vertical position on a support 74 so as to be engaged by the tab 70 at the desired upper and lower limits of the travel stroke, in order to actuate the reversing valve 64 and thereby change the direction of piston motion in the cylinder 58 and drive the push rod 72 in opposite direction until the other limit switch is engaged. Thus, a reversal of direction is initiated each time a limit switch is engaged.

In the illustrated form of the invention, provision is made to hold the specimen 22 in maximum strain position for a predetermined period of time. This is accomplished by installing a timer 76 in the electric circuit with the limit switches 66 and 68 and the electrically operated reversing valve 64. The timer 76 serves to delay actuation of the reversing valve 64. Stated another way, engagement of either of the limit switches 66, 68, energizes the timer 76, preset to delay strain reversal for a predetermined period of time; and at the end of that period of time the timer 76 then energizes the reversing valve 64. The apparatus also may be operated without holding the specimens 22 in maximum strain position, that is, without delaying operation of the reversing valve, simply by presetting the timer to a zero delay position.

The strain imposed on each of the specimens may be measured by strain gauges or other suitable devices and the values transmitted to a recorder or other indicating apparatus. These are neither shown nor described for the sake of simplicity and brevity in the application, and because they do not form a part of the present invention.

The failure detection device of the present invention, now to be described, is used to detect when permanent weakening and incipient mechanical failure of the molecular structure of the specimen occurs in the waist portion 24 as evidenced by the appearance of a crack in that portion. The present invention recognizes that the deflection characteristics of the specimen 22 as a whole change appreciably after the occurrence of the first crack, the flexing of the specimen being characterized by less resistance to bending at the waist portion 24, so that if the free end experiences uniform deflection before and after failure, there will be a marked change in deflection characteristics of the specimen between the waist portion 24 and the clamped end after failure of the specimen.

As shown in FIG. 3, deflection of the specimen between the clamped end in vise 26 and the narrowest section of the waist portion 24 is measured by means of a quartz rod 80 extending downwardly through the top wall 16 into the furnace chamber 10, the lower end of the rod contacting the waist portion of the specimen. The quartz rod 80 is capable of withstanding the elevated temperatures within the furnace chamber 10, and it thus is capable of transmitting the vertical motion indicative of the deflection of specimen 22 to a movable iron core 82 of a D.C. differential transformer 84. The latter, which is sometimes termed a linear variable differential transformer, includes windings 86 connected to a low voltage D.C. source 88, preferably six volts, to create a magnetic field. The D.C. output voltage of the transformer 84 is directly dependent upon the extent of linear displacement of the core 82 from the center of the magnetic field. Thus, motion of the quartz rod 80 occasioned by deflection of the test specimen 22 produces a relative movement of core 82 with respect to the windings 86. The transformer 84 is therefore capable of accurately translating measured deflections of the specimen 22 into electrical output signals, since the developed D.C. output voltage of the transformer is directly proportional to deflection of the specimen. As shown in FIG. 3, the D.C. output voltage from the transformer 84 is measured each time the specimen is deflected upwardly to maximum deflected position by a double contact voltmeter 90 connected in the same circuit with the upper limit switch 66, an electrically actuated counter 91, and a normally closed control switch 92. The latter is preset to open in response to abnormal D.C. voltage to thereby terminate operation of the counter 91.

The relative positions of the windings 86 and the core 82 can be adjusted by varying the vertical position of the windings 86, since the latter are adjustably supported in any one of various vertical positions by a suitable support 94, incorporating a micrometer adjustment device 96, as best seen in FIG. 3. The relative positions of the windings 86 and the core 82 are adjusted while the specimen is deflected in its maximum strained position to produce a zero D.C. voltage output reading on the meter 90. Then the control switch 92 is adjusted, as aforesaid, to effect automatic termination of the functioning of counter 91 in the event there is a deviation in output voltage corresponding to a deviation, of say 20%, in normal maximum deflection of the specimen. Each test specimen is independently controlled and programmed with its own sensing mechanism consisting of transformer 84, double contact voltmeter 90, counter 91, control switch 92, support 94, rod 80, core 82, and micrometer adjustment device 96.

The counter 91 records one cyclic deflection each time the upper limit switch 66 is actuated in correspondence with each cyclic deflection of the specimen. Simultaneously, the cyclic deflection of a sound specimen produces zero or approximately zero output voltage until the specimen fails, as may be indicated by a 20% deviation from normal deflection; and switch 92 is preset to remain closed so long as the developed D.C. voltage is at a level associated with deflections of a sound specimen. But switch 92 opens when the D.C. output voltage experiences an increase or decrease, of say 20%, from the norm. In this way, the counter 91 accurately records the cyclic deflections required to produce failure.

Figure 5:
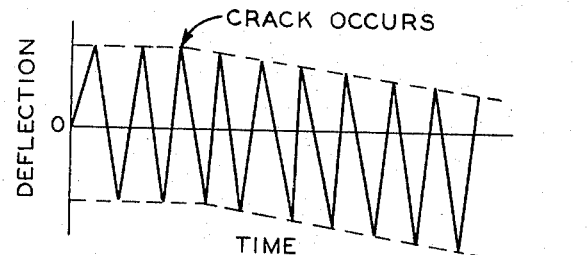
FIGS. 5, 6 and 7 are diagrams which show changes in cyclic deflection of the specimen due to cracking at various locations in the waist thereof.
Figure 6:
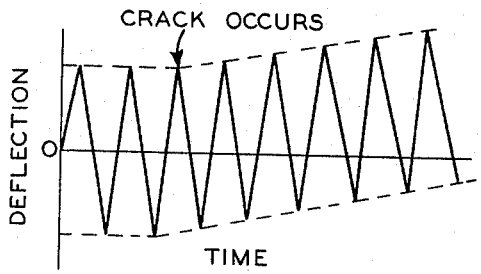
Figure 7:
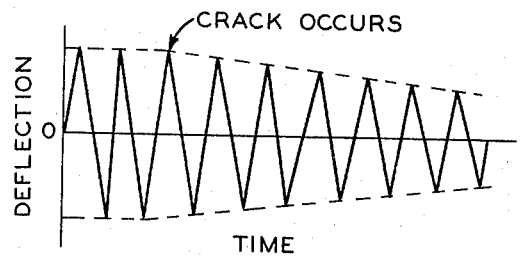

As a specimen 22 approaches the end of its fatigue life, cracks can occur in either of the following three ways:

(a) The specimen can start to crack on the top surface (see FIG. 5);

(b) The specimen can start to crack on the bottom surface (see FIG. 6); or (c) Cracks can initiate on both surfaces simultaneously (see FIG. 7).

The three types of cracking will result in three types of change in the cycle at the location of the quartz rod, as shown in FIGS. 5, 6 and 7. Since the double-contact meter 90 and control switch 92 have both an upper and a lower limit, the circuit will be broken to stop the counter for a particular specimen when it cracks, regardless of the location in the waist 24 of the cracks.

The limits on the double-contact meters 90 are set at about ±10 mv. to detect a change in deflection equivalent to ±0.00033 inch; and by test this limit has been found satisfactory for early detection of cracks.

Referring now to FIG. 4, the hydraulic and electrical circuits are combined in a single view, with thin lines designating the hydraulic circuit and heavy lines designating the electrical circuit. It will be noted that the electrical circuit is somewhat more detailed than in FIG. 3, partly because there is a showing of all electrical apparatus for the four specimens undergoing testing. The four circuits A, B, C and D, each comprising a voltmeter 90, counter 91, and control switch 92, are arranged in parallel with one another between the timer 76 and a relay 98. It is the function of the relay 98 and its electrical circuitry to maintain the main power switch 100 closed so long as any one of the test specimens 22 is still in sound condition and any one of the control switches 92 is closed. At the same time, a holding circuit is maintained so the relay 98 can deliver power to the pump motor 62 and make electric power available to the heating elements 18 so long as at least one specimen is in sound condition and the fatigue test is continuing. However, when all control switches 92 are open, indicating that all specimens have failed, the holding circuit of the relay 98 opens and the power switch 100 controlled by the relay 98 is released to open position, thereby cutting off electrical power to the pump motor 62 and the heating elements 18. As mentioned previously, the overtemperature alarm 38 cuts off all electrical power in the event of excessive temperature in chamber 10 and controller 36 regulates power to the heating elements 18 in order to maintain proper temperature.

As shown, switch 100 is biased toward open position so that start-up of the testing machine initially requires overcoming of this bias while manually closing switch 100 with all four control switches 92 in closed position.

With the present arrangement, with one end of the specimen clamped in vise 26, cyclical forces are applied to the test specimen through the cooperative effect of members 50, crosshead 54, and push rod 72 motivated by hydraulic cylinder 58. The length of stroke and reversal of direction of stroke are controlled by limit switches 66 and 68 which actuate reversing valve 64 for applying hydraulic pressure from pump 60 in appropriate direction within the cylinder 58. The pump motor 62 and the heating elements 18 receive electric power so long as at least one of the specimens is sound, which condition is determined by the level of D.C. output from transformer 84 in relation to the deflection of the specimen 22 between its clamped end and its waist portion 24.

The method of fatigue testing disclosed by the present invention comprises the following steps:

(a) Fixedly holding one end portion of the specimen;
(b) Flexing the specimen repeatedly in transverse direction;
(c) Counting the flexing cycles experienced by the specimen;
(d) Measuring the transverse deflection of the specimen at a point between the fixedly held one end portion and the maximum stress location of the specimen; and
(e) Terminating the flexing of the specimen and/or the counting of the flexing cycles when the measured transverse deflection of the specimen changes to an abnormal level, that is, deviates appreciably from the amount of deflection experienced by a sound specimen.

From the foregoing, it can be seen that the present invention provides improvements in flexure fatigue testing, especially in regard to determining failure of the specimen, and accurately registering the number of flexing cycles required to produce failure. The improvements lend themselves to incorporation in high temperature fatigue testing procedures and apparatus. The foregoing is accomplished without regard to the deflection-power input relationship, and also without regard to the natural vibrational frequency of the specimen.

Although the invention has been described specifically, it will be obvious to those skilled in the art that it is not so limited, but that it is susceptible of various changes and modifications without departing from the spirit thereof, as covered by the following claims.

What is claimed is:

1. Apparatus for fatigue testing a specimen provided with a waist section for concentration of stress intermediate the ends of the specimen, comprising:

(a) means for fixedly holding one end of said specimen,
(b) means for repeatedly flexing the opposite end of said specimen in opposite transverse directions, (c) means for counting the flexing cycles experienced by said specimen, and (d) means cooperative with the specimen and responsive to changes in the level of transverse deflection of said specimen at a point between said holding means and the point of maximum stress location for deactivating said counting means.

2. A fatigue testing arrangement according to claim 1 for flexurally testing a plurality of test specimens each having a waist section intermediate the ends thereof including, (a) means for fixedly holding one end of each of the test specimens, means for repeatedly flexing the opposite end of each of said test specimens, and means for individually counting the flexing cycles experienced by each of said test specimens, and (b) wherein the responsive means is a motion sensing means that cooperates with the waist section of each of the test specimens for individually indicating failure thereof.

3. The arrangement according to claim 2 wherein the motion sensing means responds to failure within the waist section by sensing a variation in specimen deflection at a point intermediate the point of maximum stress location and the fixedly held end.

4. Apparatus according to claim 1 wherein the responsive means measures the transverse deflection of the specimen at said point and deactivates the counting means when the deflection deviates from a predetermined level of deflection.

5. Apparatus according to claim 1 wherein the flexing means is a reciprocating member which cooperates with the opposite end of the specimen to deflect the specimen as a free cantilever.

6. Apparatus according to claim 1 wherein the flexing means deflects the specimen before and after failure thereof and is presettable for holding the specimen in maximum strained positions for a predetermined time period during each flexing cycle.

7. Apparatus according to claim 9 wherein the responsive means measures the transverse deflection of the specimen at said point and deactivates the flexing means when the deflection deviates from a predetermined level of deflection.

8. Fatigue testing apparatus according to claim 1 including:

(e) presettable means for holding said specimen in maximum stressed positions for a predetermined time period during each bending cycle.

9. Apparatus for fatigue testing a specimen provided with a waist section for concentration of stress intermediate the ends of the specimen, comprising:

(a) means for fixedly holding one end portion of said specimen, (b) means for repeatedly flexing the opposite end of said specimen in opposite transverse directions, (c) means for counting the flexing cycles experienced by said specimen, (d) means cooperative with the specimen and responsive to changes in the level of transverse deflection of said specimen at a point between said holding means and the point of maximum stress location for deactivating said flexing means.

10. A method of fatigue testing a specimen provided with a waist section which experiences maximum stress and is located intermediate the ends of the specimen, comprising the steps of:

(a) fixedly holding one end portion of said specimen,
(b) flexing the other end of said specimen repeatedly in opposite transverse directions,
(c) counting the flexing cycles experienced by said specimen,
(d) measuring the transverse deflection of said specimen at a point between said holding means and the maximum stress location, and (e) terminating the flexing of said specimen when the measured transverse deflection thereof at said point deviates from a normal level.

11. A method of fatigue testing a specimen provided with a waist section which experiences maximum stress and is located intermediate the ends of the specimen, comprising the steps of:

(a) fixedly holding one end portion of said specimen,
(b) flexing the other end of said specimen repeatedly in opposite transverse directions,
(c) counting the flexing cycles experienced by said specimen,
(d) measuring the transverse deflection of said specimen at a point between said holding means and the maximum stress location, and
(e) terminating the counting of flexing cycles upon the occurrence of a substantial change in measured transverse deflection at this point.

12. The method according to claim 11 including the step of:

(f) terminating the flexing of said specimen when the measured transverse deflection thereof at said point deviates from a normal level.

13. Apparatus for fatigue testing an elongated cantilever specimen having a waist portion intermediate the ends thereof comprising:

(a) means for fixedly clamping one end of said specimen,
(b) means for cyclically deflecting said specimen to obtain maximum deflection at the other end thereof,
(c) means for counting cyclic deflections of said specimen, and
(d) actuating means responsive to deflection of said specimen between said fixed end and any part of the waist portion, said actuating means being operatively associated with said cyclic deflection means for maintaining said deflecting means in operation so long as said specimen undergoes normal deflection between said waist and said fixed end of said specimen, whereby the operation of said counting means is terminated incident to substantially changed deflection of said specimen between any part of the waist and said fixed end of said specimen.

14. Apparatus for flexure fatigue testing a cantilever specimen, wherein said specimen is adapted to fail at a point intermediate the ends thereof, comprising:

(a) wall structure defining a furnace chamber for housing said specimen;
(b) means for clamping one end of said specimen as a cantilever;
(c) means including driving means for flexing said specimen;
(d) means for heating said furnace chamber and maintaining a predetermined temperature therein;
(e) means for terminating the operation of said flexing means and said heating means if the temperature in said chamber is excessively above said predetermined temperature;
(f) presettable means for holding said specimen in maximum strained positions for a predetermined time period during each flexing cycle;
(g) means for counting flexing cycles of said specimen;
(h) means for measuring deflection of said specimen between the clamped end thereof and the intermediate point thereon; and
(i) means operatively associated with said measuring means and responsive to a substantial change in measured deflection for terminating the operation of said counting means.

15. Apparatus according to claim 14 for flexure fatigue testing a plurality of cantilever specimens simultaneously, comprising counting means (g), deflection measuring means (h), and terminating means (i) for each specimen, and including:

(j) a device operatively associated with said terminating means (i) for discontinuing operation of said heating means and said flexing means when all of said counting means are deactivated.

References Cited

UNITED STATES PATENTS

| | | | |
|---|---|---|---|
| 2,495,746 | 1/1950 | Lubin | 73—15.6 |
| 2,587,317 | 2/1952 | Henry | 73—91 X |
| 2,591,444 | 4/1952 | Lazan | 73—91 |
| 2,670,624 | 3/1954 | Faris et al. | 73—15.6 |
| 3,134,256 | 5/1964 | Wolstenholme | 73—15.6 |
| 3,170,321 | 2/1965 | Sullivan et al. | 73—100 |
| 3,196,669 | 7/1965 | Fischer | 73—91 |

FOREIGN PATENTS 716,572 10/1954 Great Britain.
6,456 3/1907 Great Britain.

OTHER REFERENCES

Pelloux, R. M., Brooks, S. D., Hydraulic Tension-Compression Fatigue Machine, The Review of Scientific Instruments, vol. 35, No. 11, November 1964, pp. 1564–1567, classified class 73, sub. 92.

RICHARD C. QUEISSER, *Primary Examiner.*

JAMES J. GILL, *Examiner.*

JAMES H. WILLIAMSON, *Assistant Examiner.*